US011060410B2

(12) United States Patent
Blair et al.

(10) Patent No.: US 11,060,410 B2
(45) Date of Patent: Jul. 13, 2021

(54) METHOD OF FORMING A PROTECTIVE SHEATH FOR AN AEROFOIL COMPONENT

(71) Applicant: ROLLS-ROYCE plc, London (GB)

(72) Inventors: Daniel J. Blair, Nottingham (GB); Timothy J. Summers, Nottingham (GB); Ewan F. Thompson, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 16/737,979

(22) Filed: Jan. 9, 2020

(65) Prior Publication Data
US 2020/0277865 A1    Sep. 3, 2020

(30) Foreign Application Priority Data

Jan. 23, 2019    (GB) ...................................... 1900911

(51) Int. Cl.
*F01D 5/28*    (2006.01)
*F01D 5/14*    (2006.01)

(52) U.S. Cl.
CPC .............. *F01D 5/288* (2013.01); *F01D 5/147* (2013.01); *F05D 2240/303* (2013.01); *F05D 2240/304* (2013.01)

(58) Field of Classification Search
CPC ......... F05D 2240/304; F05D 2240/303; F05D 2230/232; F05D 2230/234; F05D 2240/307; F01D 5/147; F01D 5/288; B23P 15/04
See application file for complete search history.

(56) References Cited

U.S. PATENT DOCUMENTS

| 2,615,236 A | * | 10/1952 | Stulen | .................... | B23K 31/02 |
| | | | | | 29/889.72 |
| 8,782,887 B2 | * | 7/2014 | Franchet | ................. | B23P 15/04 |
| | | | | | 29/889.71 |

(Continued)

FOREIGN PATENT DOCUMENTS

| EP | 2348192 | 7/2011 |
| EP | 2586972 | 5/2013 |

(Continued)

OTHER PUBLICATIONS

Great Britain search report dated May 16, 2019, issued in GB Patent Application No. 1900911.7.

(Continued)

*Primary Examiner* — Courtney D Heinle
*Assistant Examiner* — Andrew Thanh Bui
(74) *Attorney, Agent, or Firm* — Brinks Gilson & Lione

(57) ABSTRACT

A method of forming a protective sheath for an aerofoil component includes: providing a first sheath portion and a second sheath portion, the first sheath portion and the second sheath portion each comprising an inner surface, an outer surface and an end surface between the inner and outer surfaces and having a sacrificial flange at its distal end; positioning the first sheath portion and second sheath portion so that the inner surface of the first sheath portion abuts against the inner surface of the second sheath portion with the end surfaces of the first and second sheath portions aligned to form a mating edge; and joining the first sheath portion to the second sheath portion by welding along the mating edge, wherein the sacrificial flanges are completely consumed and a curved outer profile is formed.

15 Claims, 6 Drawing Sheets

(56) References Cited

U.S. PATENT DOCUMENTS

| | | | |
|---|---|---|---|
| 2011/0033308 A1* | 2/2011 | Huth | F04D 29/023 |
| | | | 416/229 R |
| 2012/0114494 A1* | 5/2012 | Ford | F04D 29/324 |
| | | | 416/229 R |
| 2012/0233859 A1* | 9/2012 | Cattiez | F04D 29/324 |
| | | | 29/889.7 |
| 2013/0236323 A1 | 9/2013 | Mironets et al. | |

FOREIGN PATENT DOCUMENTS

| | | |
|---|---|---|
| EP | 3165322 | 5/2017 |
| EP | 3332902 A1 | 6/2018 |
| WO | 2011064406 A1 | 6/2011 |
| WO | 2014055499 A1 | 4/2014 |
| WO | 2014143260 | 9/2014 |

OTHER PUBLICATIONS

European Opinion with Communication Transmittal for Patent Application No. EP19219320.9 dated Jun. 15, 2020, 5 pages.
European search report dated May 29, 2020, issued in EP Patent Application No. 19219320.9.

* cited by examiner

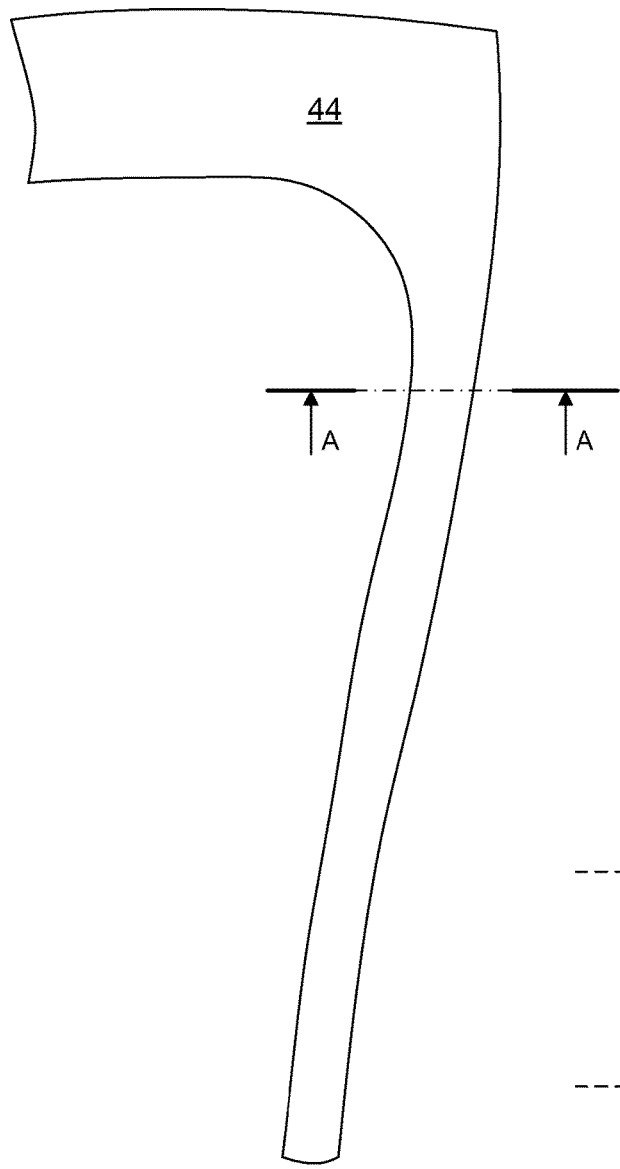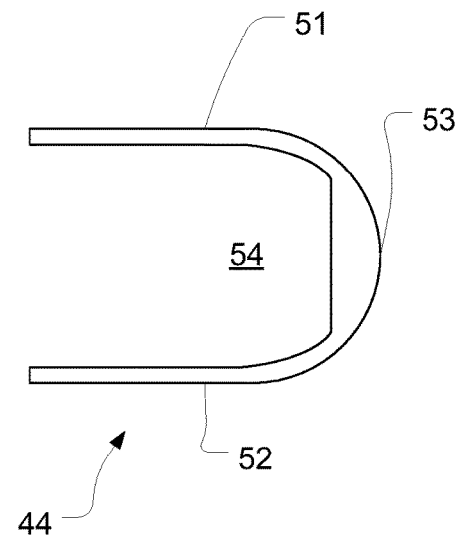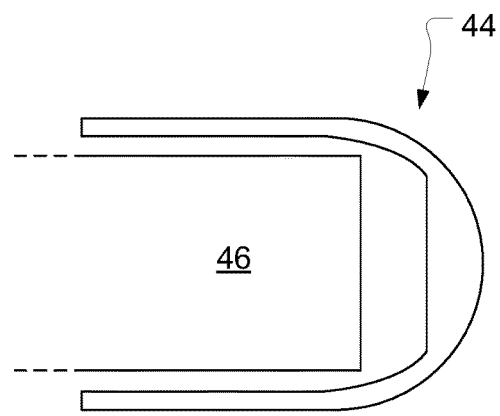
Fig. 4b
Fig. 4c
Fig. 4a

METHOD OF FORMING A PROTECTIVE SHEATH FOR AN AEROFOIL COMPONENT

CROSS-REFERENCE TO RELATED APPLICATIONS

This specification is based upon and claims the benefit of priority from UK Patent Application No. GB 1900911.7, filed on 23 Jan. 2019, the entire contents of which are incorporated herein by reference.

BACKGROUND

Technical Field

The present disclosure relates to a method of forming a protective sheath for an aerofoil component, a protective sheath for an aerofoil component, an aerofoil component and a gas turbine engine.

Description of the Related Art

A turbomachine, for example, a gas turbine engine, may comprise a fan, which has fan blades. A fan blade may have at least two regions manufactured from different materials. In an example, a body of the fan blade may be manufactured from a composite material. The fan blade may have a protective leading and/or trailing edge. The protective edge may be manufactured from a material such as a metal, for instance titanium, that is better able to resist impact (for example from birds, ice or other material) than the rest of the blade. The protective edge can be manufactured as a protective sheath which can be subsequently bonded over the fan blade.

A protective sheath may be manufactured by joining together at least two sheath portions. In an example, the two sheath portions may be joined together by welding. However, difficulties may arise when producing a welded joint of the requisite quality. Aligning the sheath portions accurately before welding can be difficult and the process can be time consuming. The risk of developing weld defects may be high due to the low thickness of the material of the sheath portions. Minor discrepancies in the alignment of the sheath portions can result in weld blow through or a lack of joint between the sheath portions. There can also be difficulties in producing an aerodynamic aerofoil shape on the external surface of the protective sheath.

There is a need to develop an improved manufacturing process for an aerofoil protective sheath to alleviate some of the aforementioned problems.

SUMMARY

According to a first aspect of the disclosure there is provided a method of forming a protective sheath for an aerofoil component comprising: providing a first sheath portion and a second sheath portion, the first sheath portion and the second sheath portion each comprising an inner surface, an outer surface and an end surface between the inner and outer surfaces and having a sacrificial flange at its distal end; positioning the first sheath portion and second sheath portion so that the inner surface of the first sheath portion abuts against the inner surface of the second sheath portion with the end surfaces of the first and second sheath portions aligned to form a mating edge; and joining the first sheath portion to the second sheath portion by welding along the mating edge, such that the sacrificial flanges are completely consumed and a curved outer profile is formed.

The first sheath portion may be configured to form part of a pressure surface of the aerofoil component and the second sheath portion may be configured to form a suction surface of the aerofoil component.

The protective sheath may be configured to provide a trailing edge of the aerofoil component.

The protective sheath may be configured to provide a leading edge of the aerofoil component.

The first sheath portion may be joined to the second sheath portion by laser welding.

A weld bead may be formed on an internal surface of the protective sheath.

The first sheath portion and the second sheath portion may be formed from titanium.

The first and second sheath portions may each comprise a curved section which is spaced from the end surface by the sacrificial flange. After welding, the curved outer profile may be formed between the curved sections of the first and second sheath portions.

The curvature of the curved outer profile may correspond to (i.e. is the same as) the curvature of the curved sections.

The curved outer profile may have a constant curvature.

The curved outer profile may follow an elliptical arc.

The curved profile may be asymmetrically curved.

According to a second aspect of the disclosure, there is provided a protective sheath for an aerofoil component, formed by the method of the first disclosure.

According to a third aspect of the disclosure, there is provided an aerofoil component comprising the protective sheath according to the second aspect.

According to a fourth aspect of the disclosure, there is provided a gas turbine engine comprising at least one blade, wherein the at least one blade comprises the protective sheath according to the second aspect.

According to a fifth aspect of the disclosure, there is provided a method of manufacturing an aerofoil component comprising: providing an aerofoil body; providing a protective sheath formed by the aforementioned method; fitting the protective sheath over an edge of the aerofoil body; and bonding the protective sheath to the aerofoil body.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

The fan of a gas turbine as described and/or claimed herein may have any desired number of fan blades, for example 16, 18, 20, or 22 fan blades.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which:

FIG. 4a is a front view of a protective sheath of the fan blade of FIG. 4;

FIG. 4b shows a cross-section through the protective sheath of FIG. 5a;

FIG. 4c shows a cross-section through the protective sheath with a main body portion positioned therein;

DETAILED DESCRIPTION

Figure 1:
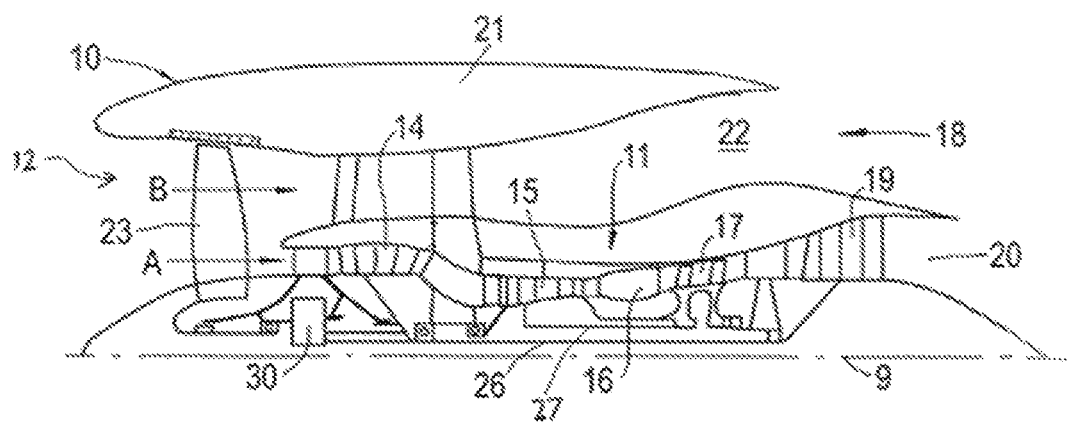
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
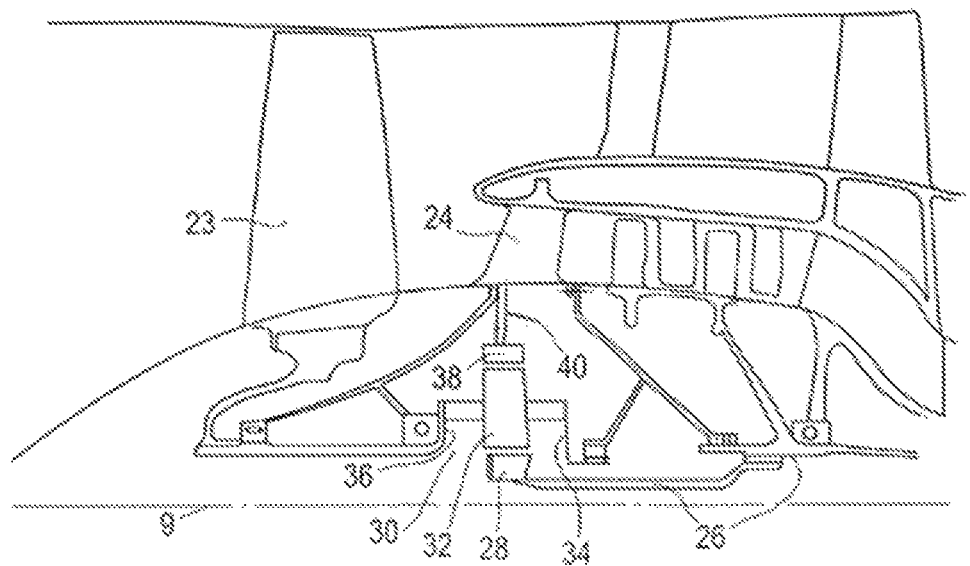
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 3:
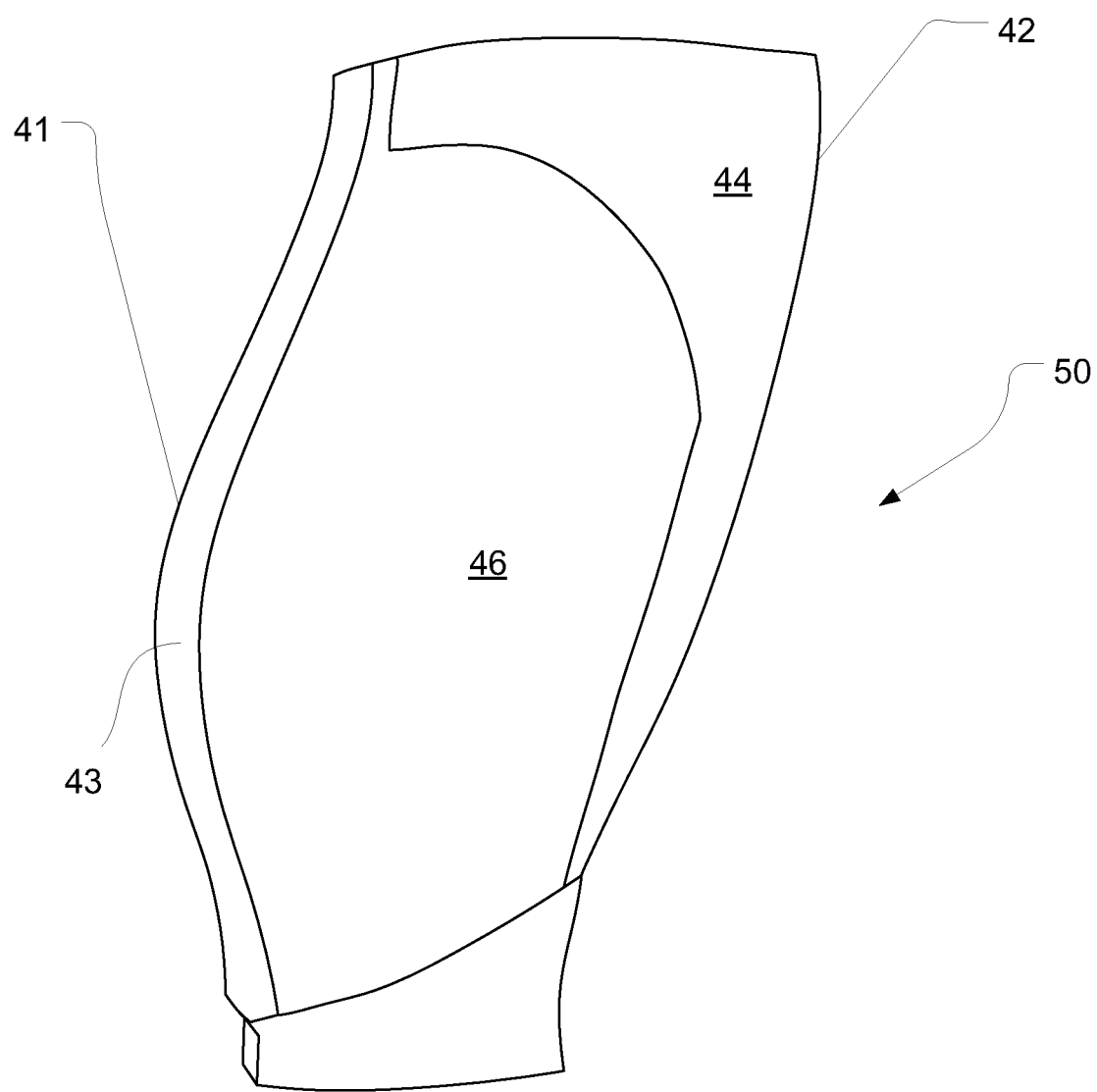
FIG. 3 is a side view of a fan blade for a gas turbine engine.

The fan 23 comprises a plurality of fan blades 50. An example fan blade 50 is shown in FIG. 3. The fan blade 50 comprises a main body portion 46, a leading edge 41 formed by a first protective sheath 43, and a trailing edge 42 formed by a second protective sheath 44. The main body portion 46 is formed from a different material to the first and second protective sheaths 43, 44. For example, the main body portion 46 may be formed from a composite material, whereas the protective sheaths 43, 44 may be formed from a metal. The protective sheaths 43, 44 may be used to provide improved impact and/or wear resistance (compared to the material of the main body portion). The blade sheaths 43, 44 can be manufactured separately and subsequently fitted over the edges of the main body 46 and bonded thereto.

As shown in FIG. 3, the first protective sheath 43 extends along one side of the main body portion 46 and the second protective sheath 44 extends along the opposing side of the main body portion 46. The first and second protective sheaths 43, 44 extend from a root to a tip of the blade 50. In the example shown, the protective sheaths 43, 44 extend along the full length of the main body portion 46 from the root to the tip; however, in other examples, the protective sheaths may extend only along part of the length of the main body portion 46. As shown, the second protective sheath 44 also extends along part of the tip of the blade 50.

As well as providing improved structural properties, the protective sheaths 43, 44 also provide the required aerodynamic profiles on the edges of the fan blade 50 in order to maximise operating efficiency of the engine.

FIG. 4a shows in isolation the protective sheath 44 which forms the trailing edge 42 of the fan blade 50. FIG. 4b shows a cross-section through the protective sheath 44. As shown, the protective sheath 44 comprises first and second opposing walls 51, 52 which form part of opposing pressure and suction surfaces of the blade 50 and a curved section 53 therebetween. In this example, the curved section 53 has an outer profile which has a constant radius of curvature and so follows a circular arc. Specifically, the outer profile is semi-circular. The protective sheath 44 forms a cavity 54 which receives the edge of the main body portion 46, as shown in FIG. 4c. The protective sheath 44 can be secondary bonded onto the main body 46 of the fan blade 50, for example, with the use of adhesive.

Figure 5C:
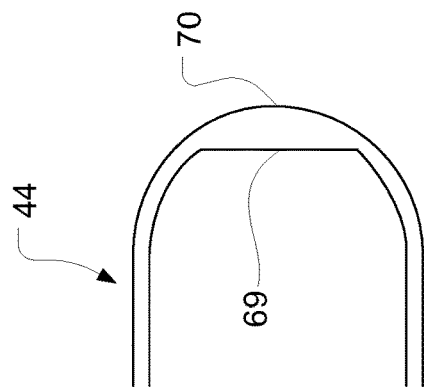
FIGS. 5a-5c are cross-sectional views illustrating a method of forming a protective sheath according to an exemplary embodiment.
Figure 5B:
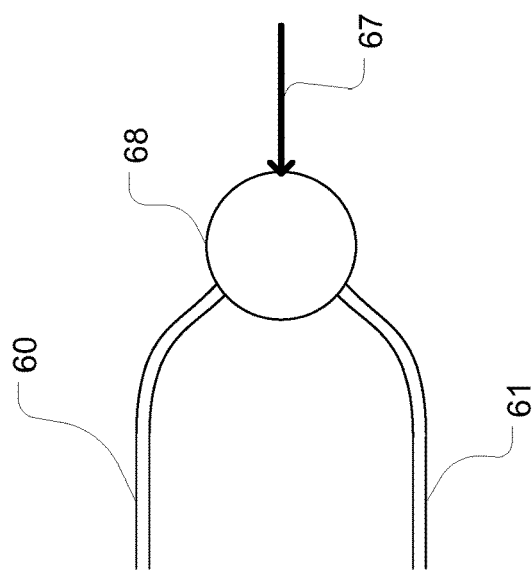
Figure 5A:
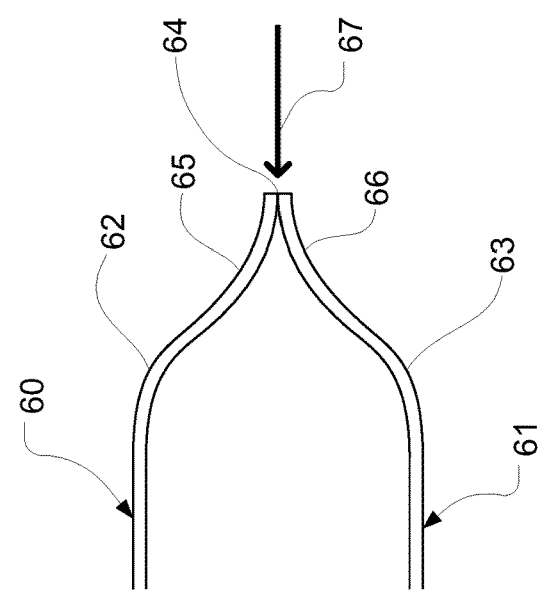

As shown in FIGS. 5a to 5c, the protective sheath 44 is formed by joining together a first protective sheath portion 60 and a second protective sheath portion 61, along the spine of the trailing edge 42 of the blade. In this example, the first protective sheath portion 60 and second protective sheath portion 61 are formed as complementary halves of the protective sheath 44; however, it will be appreciated that the first and second protective sheath portions 60, 61 may be different and do not necessarily need to form two halves of the protective sheath. In this example, the protective sheath portions 60, 61 are manufactured from titanium, although they may be formed from any other suitable metal (and their alloys), such as steel, nickel and aluminium. The protective sheath portions 60, 61 may be manufactured using a hot or cold forming process.

FIGS. 5a to 5c show an outer edge of the protective sheath portions 60, 61. The outer edge of the protective sheath portions 60, 61 is that which is configured to lie along the spine of the edge of the fan blade 50. The outer edge of the first protective sheath portion 60 comprises a curved section 62 and a flange 65 which is provided at a distal end of the first protective sheath portion 60 and extends outward from the curved section 62. Similarly, the outer edge of the second protective sheath portion 61 comprises a curved section 63 and a flange 66 which is provided at a distal end of the first protective sheath portion 61 and extends outward from the curved section 63. In an example, the curved section 62, 63 and flange 65, 66 extend along the entirety of the outer edge of the protective sheath portions 60, 61. The curved section 62 and flange 65 may be integrally formed with the protective sheath portion 60, as part of the hot or cold forming process.

The flanges 65, 66 each comprise an inner surface, an outer surface and an end surface formed between the inner and outer surfaces. As shown in FIG. 5a, the first protective sheath portion 60 and the second protective sheath portion 61 are brought into alignment such that the inner surfaces of the flanges 65, 66 abut against one another and the end surfaces are aligned to form a mating edge 64 along the length of the flanges 65, 66.

The flanges 65, 66 allow the protective sheaths portions 60, 61 to be quickly and accurately aligned owing to their large surface area. This eliminates the need for an operator to use additional tools to manually manipulate the protective sheath portions 60, 61 to achieve the required alignment.

Once the protective sheath portions 60, 61 have been aligned, a welding process is used to join the protective sheath portions 60, 61 together. In an example, a laser welding process is used. Other welding processes, such as Tungsten Inert Gas (TIG) and electron beam welding, may be used. The laser welding process operates in a conventional manner, comprising a laser beam 67 which provides the energy source required for welding.

During the welding process, the laser beam 67 is directed onto the mating edge 64 of the flanges 65, 66, such that the laser beam 67 impinges on the end surfaces of the flanges 65, 66 (forming an edge weld). The laser beam 67 is directed towards the flanges 65, 66 along a direction substantially parallel to the direction in which the flanges extend 65, 66 (i.e. into the interior of the cavity; between the flanges 65, 66). The high energy of the laser beam 67 causes the flanges 65, 66 to heat up and the temperature of the material in the flanges 65, 66 to reach its melting point. With reference to FIG. 5b, this results in the melting of the material and the creation of a weld pool 68 from the molten material at the interface between the flanges 65, 66. The high temperature of the weld pool 68 causes the surrounding material in the flanges 65, 66 to be drawn into the weld pool 68. The laser beam 67 continues to be active until all the material from the flanges 65, 66 has been drawn into the weld pool 68. At this point, the flanges 65, 66 are considered to be completely consumed into the weld pool 68. The laser beam 67 may traverse the length of the mating edge 64 to form a continuous join between the first and second protective sheath portions 60, 61.

As described previously, the flanges 65, 66 are consumed during the welding process and so are considered to be sacrificial. The curved sections 62, 63 enables the curved outer profile to be produced in the protective sheath 44, after joining of the protective sheath portions 60, 61.

As shown in FIG. 5c, a weld bead 69 is formed on an internal surface (within the interior of the cavity 54) of the joint between the protective sheath portions 60, 61. Due to the complete consumption of the flanges 65, 66 in the welding process, the external surface 70 of the joint forms the curved outer profile, as described previously with respect to FIG. 4b. Due to the weld bead 69 being formed on the internal surface of the joint, the external surface 70 of the joint comprises a smooth surface finish. Thus, no additional processing (or minimal additional processing) is required after welding in order to produce a smooth surface finish on the external surface 70 of the protective sheath 44. This method enables the desired external aerodynamic profile and surface finish to be produced directly from the welding process, eliminating the need for additional manufacturing time and cost. Furthermore, due to the complete consumption of the flanges 65, 66, the quality of the welded joint is not affected by any minor misalignment between the flanges 65, 66 prior to welding or any minor variations in material thickness of the flanges 65, 66.

Figure 6A:
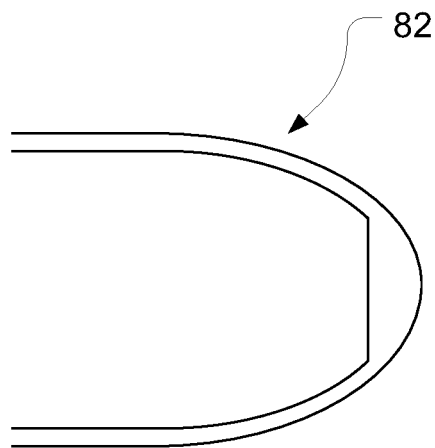
FIGS. 6a and 6b show cross-sections through protective sheaths according to other exemplary embodiments.
Figure 6B:
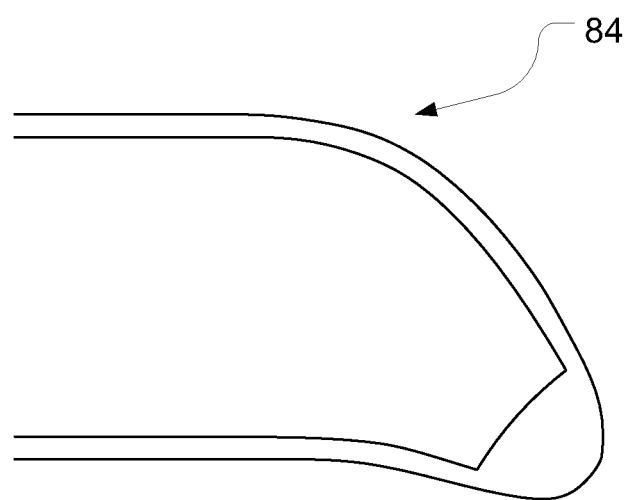

Although the protective sheath 44 has been described as comprising a cross-section having a curved outer profile which has a constant radius of curvature and so follows a circular arc, it will be appreciated that other curved profiles may be produced. For example, with reference to FIG. 6a, the protective sheath 44 may have an outer surface which follows an elliptical arc 82 or, with reference to FIG. 6b, the protective sheath 44 may have an outer surface which has an asymmetrically curved profile 84. The dimensions of the curved sections 62, 63 and the flanges 65, 66 of the protective sheath portion 60 can be selected in order to provide the required curved profile of the protective sheath 44.

Although the protective sheath 44 has been described with reference to a fan blade, it will be appreciated that it may be used for other rotor blades in a turbomachine, such as compressor or turbine blades. It may also find uses on other aerofoil components, such as on wings, helicopter rotors, wind turbines, etc.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of forming a protective sheath for an aerofoil component comprising:
   providing a first sheath portion and a second sheath portion, the first sheath portion and the second sheath portion each comprising an inner surface, an outer surface and an end surface between the inner and outer surfaces and having a sacrificial flange at its distal end;
   positioning the first sheath portion and second sheath portion so that the inner surface of the first sheath portion abuts against the inner surface of the second sheath portion with the end surfaces of the first and second sheath portions aligned to form a mating edge; and
   joining the first sheath portion to the second sheath portion by welding along the mating edge, such that the sacrificial flanges are completely consumed, and a curved outer profile is formed;
   wherein the curved outer profile is formed inward of the positions of the sacrificial flanges before the sacrificial flanges are completely consumed.

2. The method according to claim 1, wherein the first sheath portion is configured to form part of a pressure surface of the aerofoil component and the second sheath portion is configured to form a suction surface of the aerofoil component.

3. The method according to claim 1, wherein the protective sheath is configured to provide a trailing edge of the aerofoil component.

4. The method according to claim 1, wherein the protective sheath is configured to provide a leading edge of the aerofoil component.

5. The method according to claim 1, wherein the first sheath portion is joined to the second sheath portion by laser welding.

6. The method according to claim 1, wherein a weld bead is formed on an internal cavity surface of the protective sheath.

7. The method according to claim 1, wherein the first sheath portion and the second sheath portion are formed from titanium.

8. The method according to claim 1, wherein the first and second sheath portions each comprise a curved section which is spaced from the end surface by the sacrificial flange; and wherein, after welding, the curved outer profile is formed between the curved sections of the first and second sheath portions.

9. The method according to claim 8, wherein the curvature of the curved outer profile corresponds to the curvature of the curved sections.

10. The method according to claim 1, wherein the curved outer profile has a constant curvature.

11. The method according to claim 1, wherein the curved outer profile follows an elliptical arc.

12. The method according to claim 1, wherein the curved outer profile is asymmetrically curved.

13. A protective sheath for an aerofoil component formed according to the method of claim 1.

14. An aerofoil component comprising a protective sheath according to claim 13.

15. A gas turbine engine comprising at least one blade, wherein the at least one blade comprises a protective sheath according to claim 13.

* * * * *